Nov. 20, 1934.   J. D. STIRISS   1,981,829
MOVING PICTURE PROJECTOR
Filed June 28, 1934   2 Sheets-Sheet 2
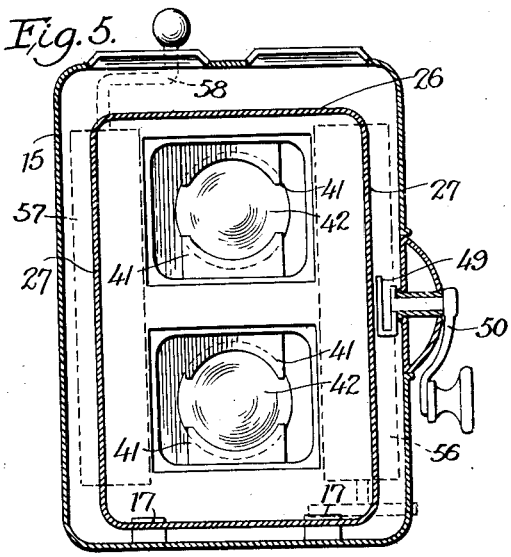
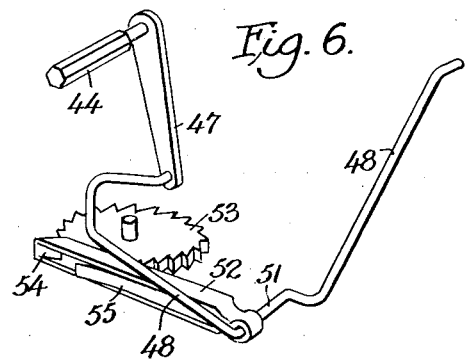
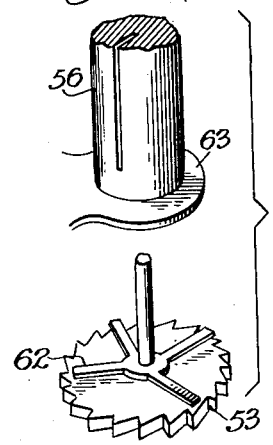
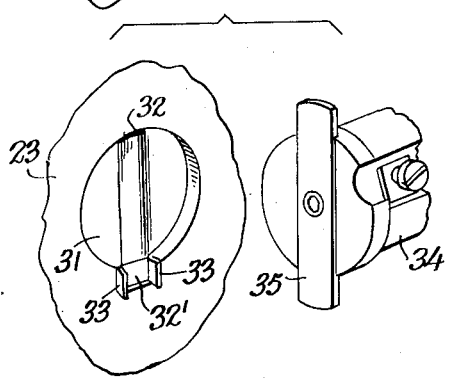
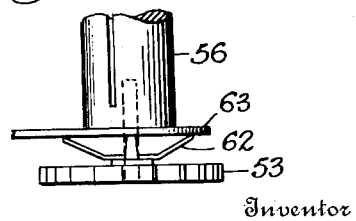
Inventor
Jacob D. Stiriss.
By James F. Duhamel
Attorney Patented Nov. 20, 1934

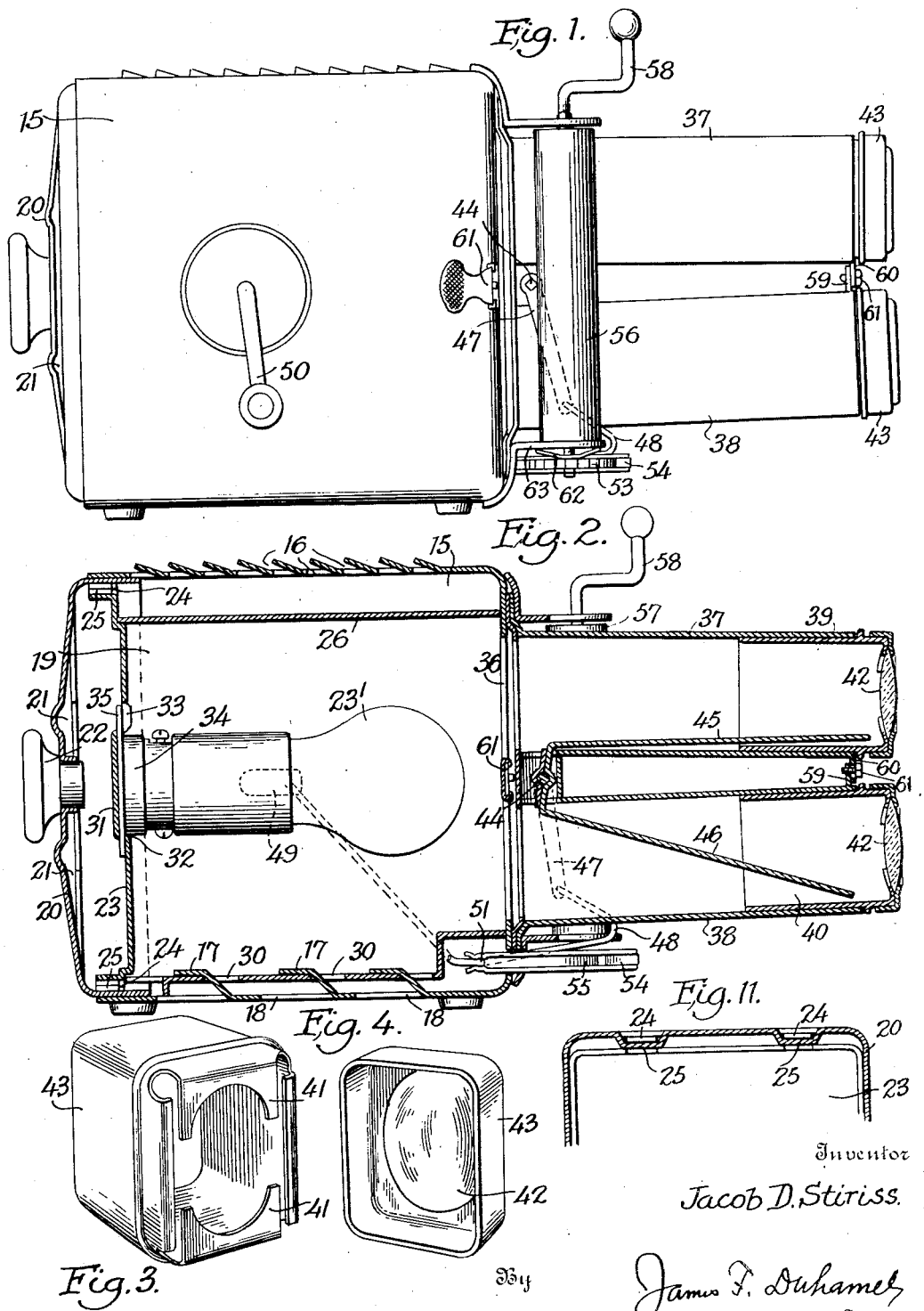

1,981,829

UNITED STATES PATENT OFFICE 1,981,829

MOVING PICTURE PROJECTOR

Jacob D. Stiriss, Cleveland, Ohio, assignor to Durable Toy and Novelty Corporation, New York, N. Y.

Application June 28, 1934, Serial No. 732,932

8 Claims. (Cl. 88—16.6)

This invention relates to moving picture projectors and more particularly to toy projectors, the object of the invention being to so construct the device that intense heat from the lamp is eliminated and a shutter is provided to cause a gradual projection of the film objects, or its gradual fading.

Further objects of the invention consist of a novel means for winding and rewinding the film, the mounting of the lenses, the mounting of the lamp socket, the cooling of the housing, and the simple arrangement of the device, all of which are more fully described in the following specification, set forth in the appended claims and illustrated in the accompanying drawings, wherein:

Figure 1 is a side elevation of the improved projector.

Fig. 2 is a vertical longitudinal sectional view of the same.

Fig. 3 is a perspective view of the telescopic lens section of one of the projecting tubes.

Fig. 4 is a perspective view of the lens holding cap shown as about to be fitted on the lens section.

Fig. 5 is a transverse sectional view of the projector looking forward.

Fig. 6 is a perspective view of the detached shutter and reel operating mechanism.

Fig. 7 is a perspective view of the shutter detached.

Fig. 8 is a perspective view of part of the winding reel with its ratchet wheel detached.

Fig. 9 is a perspective view of the lamp socket and its attaching means and about to be secured together.

Fig. 10 is an elevation of the lower end of the winding reel.

Fig. 11 is a detail view of the attaching means for the lamp box to the door.

The present invention is an improvement on patents issued to applicant June 19th, 1934 for Moving picture projectors and Numbered 1,963,454 and 1,963,455, and where it is intended to simplify the construction of the projector and to increase the facilities for cooling the housing and the lamp carrying box.

For this purpose the housing 15 has ventilating openings 16 in its top to carry off the heated air and from its bottom tongues 17 are punched, leaving openings 18 through which fresh air may enter and pass around the lamp box 19 and out of the openings 16, thus tending to keep the housing 15 at a temperature that will not burn the hands of the operator.

The end door 20 of the housing is slotted and its central portion pressed outward leaving openings 21 at its sides for the circulation of the air and the knob 22 answers the double purpose of manipulating the door but providing a non-conductive entrance for the electric wiring for the lamp 23'.

The door 20 has an inner partition 23 which abuts against the end of the lamp box and as will be more clearly seen in Fig. 11 this partition has tongues 24 that are fitted into loops 25 in the flanges of the door 20. This lamp box has the top and side walls 26 and 27, and also the bottom 29, with slots 30 into which enter the tongues 17 of the housing when the parts are assembled. The lamp box has no front end but permits of the exit of the light from lamp 23' at that side.

The partition 23 has a central depression 31, as in Fig. 9, with a slot 32 at one side and an opening or slot 32' with flanges 33 at its sides. The lamp socket 34 carries on its end a cross bar 35 by which it is attached to the door by the insertion of one end in the slot 32 and pressing the bar's other end in between the flanges 33 which are springs and frictionally hold the bar with the socket on the partition.

To the front wall 36 of the housing is secured the projecting tubes 37 and 38 provided at their outer ends with the lens carrying telescopic sections 39 and 40, their front ends 41 being flexible and adapted to engage the edges of the lens 42. On the outer end of each section 39 and 40 is fitted a cap 43 having an opening into which fits the lens and by which means each lens is held in its respective section.

The tubes are deflected towards a common center and near their inner ends carry a polygonal shaft 44 that supports the shutters 45 and 46 that are so located as to alternately shut off the light passing through the film at the back of the wall 36 from the tubes and lenses.

The shaft 44 carries at one end the depending arm 47 adapted to be swung so that the shutters are thrown up and down to perform their functions. Connected with the arm 47 is a rod 48 that is actuated by a crank arm 49 within the housing and that is on a shaft journalled in one side of the housing and having a handle 50 to rotate it from the outside.

On a horizontal bend 51 of the rod 48 is journalled a pawl 52 made up of parallel members that embrace a ratchet wheel 53 and has at its outer end a blade 54 that engages the teeth of the said ratchet wheel, being forced into engagement by means of a spring 55 that presses against the rod. These parts are so adjusted that at the end of the forward movement, the blade 54 is out of engagement with the ratchet wheel and in this position, the film may be rewound.

When the handle 50 is rotated the bar 48 with the pawl is caused to reciprocate and the ratchet wheel 53 on the shaft of the spool or reel 56 is intermittently rotated and the film is drawn across openings in the front wall 36 and wound on said reel.

At the side of the housing opposite the reel 56 is another reel 57 which originally carries the film and from which the action above described unwinds it, but when the whole film has been displayed it is rewound on the reel 57 by means of a crank arm 58.

The angles of projection of the tubes 37 and 38 may be altered by adjusting the lips 59 and 60 held together by the screw 61.

In order to initially carry the film from one reel to the other a slide 61 having a spur or hook to engage the film is located at the front wall 36, and to prevent back action of the reel 56 a spider spring 62 is located between the ratchet 53 and the bracket 63.

It will be observed in Figs. 2 and 5 that the lamp box and the housing are separated so that a space is left between them for the circulation of air to keep the housing cool, at the same time the light is completely confined and admitted only to the projector tubes.

It is obvious that the parts may be otherwise arranged and modified without departing from the essential features above described or from the scope of the appended claims.

What I claim as new is:

1. In moving picture projectors, the combination of a housing having ventilating openings in its bottom and top, a closure at one end and having ventilating openings, a lamp box carried by the housing, projection tubes, and swinging shutters in said tubes.

2. In moving picture projectors, the combination of a housing having ventilating openings, a closure at one end and having ventilating openings, a partition within the closure, a lamp socket removably secured to the partition, and a lamp box carried by the housing and abutting against the partition.

3. In moving picture projectors, the combination of a housing having ventilating openings in its top and bottom, tongues on the bottom of the housing, an end closure for the housing, an interior partition in the closure, and having slots, a lamp socket having a cross bar to fit in the slots, and a lamp box having slots to receive the tongues of the housing.

4. In moving picture projectors, the combination of a housing having tongues punched from its bottom and ventilating openings in its top, a ventilated closure and adapted to be fitted in the end of the housing, a partition within the closure and having slots, a lamp socket having a cross bar adapted to be held in the slots, and a front wall having openings and carrying projection tubes.

5. In moving picture projectors, the combination of a housing adapted to contain a lamp and having openings in its front wall, projection tubes at said openings, a lateral shaft between the said tubes, shutters carried by said shaft and each adapted to swing in a tube and alternately open and close same to the light rays from the lamp, and means for actuating the shutters.

6. In moving picture projectors, the combination of a housing having a front wall with openings, projection tubes at said openings, film reels at the sides of the said tubes, a ratchet wheel on the axis of one of the reels, fluctuating shutters in said tubes and means for simultaneously actuating the shutters and rotating the said ratchet wheel.

7. In moving picture projectors, the combination of a housing having openings in its front wall, projection tubes at said openings, means for adjusting the angle of said tubes, a lateral shaft between the tubes, a fluctuating shutter for each tube and carried by the lateral shaft, film reels at each side of the tubes, a ratchet wheel on one of the reels, a reciprocating pawl for the ratchet wheel, a rod adapted to actuate the shutters and the pawl, and a crank arm operating the rod.

8. In moving picture projectors, the combination of a housing having openings in its front end, projection tubes at each opening and adapted to be adjusted, film reels at each side of the tubes, a crank arm on one of the reels, a ratchet wheel on the other reel, means for drawing a film from one reel to the other, a friction spring on the reel with the ratchet wheel, and a pawl adapted to actuate said ratchet wheel.

JACOB D. STIRISS.